(12) United States Patent
Ciolfi

(10) Patent No.: US 8,793,601 B1
(45) Date of Patent: Jul. 29, 2014

(54) HANDLING PARAMETERS IN BLOCK DIAGRAM MODELING

(75) Inventor: John Edward Ciolfi, Wellesley, MA (US)

(73) Assignee: The Mathworks, Inc., Natick, MA (US)

( * ) Notice: Subject to any disclaimer, the term of this patent is extended or adjusted under 35 U.S.C. 154(b) by 583 days.

(21) Appl. No.: 12/770,064

(22) Filed: Apr. 29, 2010

Related U.S. Application Data

(60) Division of application No. 11/253,896, filed on Oct. 19, 2005, now Pat. No. 8,615,715, and a continuation of application No. 09/911,663, filed on Jul. 24, 2001, now Pat. No. 8,196,056.

(51) Int. Cl.
*G06F 3/0482* (2013.01)

(52) U.S. Cl.
USPC ........... 715/763; 715/765; 715/771; 717/105; 717/111

(58) Field of Classification Search
IPC ....................................... G06F 3/0484,3/04842
See application file for complete search history.

(56) References Cited

U.S. PATENT DOCUMENTS

| | | | |
|---|---|---|---|
| 5,261,043 A | 11/1993 | Wolber et al. | |
| 5,301,301 A | 4/1994 | Kodosky et al. | |
| 5,475,851 A | 12/1995 | Kodosky et al. | |
| 5,481,741 A | 1/1996 | McKaskle et al. | |
| 5,627,979 A | 5/1997 | Chang et al. | |
| 5,777,621 A | 7/1998 | Schneider et al. | |
| 5,920,718 A | 7/1999 | Uczekaj et al. | |
| 5,966,532 A | 10/1999 | McDonald et al. | |
| 6,069,629 A | 5/2000 | Paterson et al. | |
| 6,138,270 A | 10/2000 | Hsu | |
| 6,160,549 A | 12/2000 | Touma et al. | |
| 6,437,805 B1 | 8/2002 | Sojoodi et al. | |
| 6,476,811 B1 | 11/2002 | DeRoo et al. | |
| 6,684,385 B1 | 1/2004 | Bailey et al. | |
| 6,754,885 B1 | 6/2004 | Dardinski et al. | |
| 6,937,257 B1 | 8/2005 | Dunlavey | |
| 8,196,056 B2 | 6/2012 | Ciolfi | |

OTHER PUBLICATIONS

Co-pending U.S. Appl. No. 11/253,896, entitled "Handling Parameters in Block Diagram Modeling"by Ciolfi, filed Oct. 19, 2005, 53 pages.

*Primary Examiner* — Namitha Pillai

(74) *Attorney, Agent, or Firm* — Harrity & Harrity, LLP

(57) ABSTRACT

A mechanism for processing graphical block diagram parameter expressions is presented. The mechanism achieves optimal implementation of block equations in the execution (run-time) environment by defining a mapping between user-defined block parameters and a run-time version of the parameters. The parameter processing mechanism also pools like, non-interfaced parameter expressions, allowing reuse of both uniform and non-uniform data across constant block parameters in the generated code and during model execution. The parameter processing mechanism further maintains an execution structure that maps the run-time parameter expressions containing interfaced variables to generated code for the block diagram so that the interfaced variables appear in the generated code. This mapping thus allows for interfacing to the interfaced variables in the generated code from any execution framework.

20 Claims, 12 Drawing Sheets

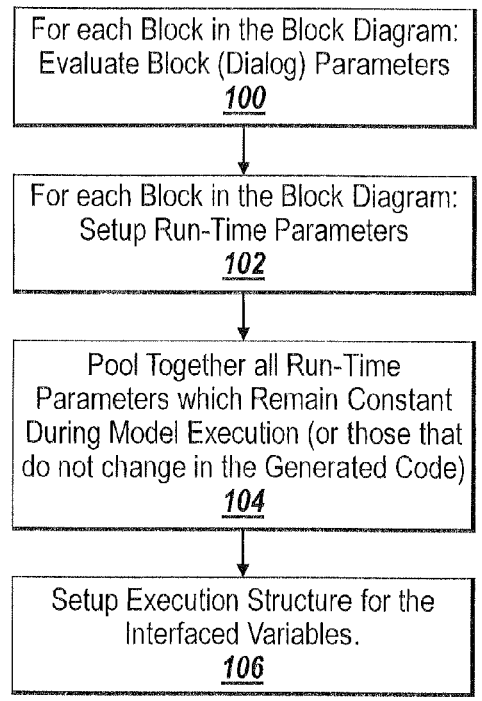

Fig. 7

```
                                                         110
Block {
    EvalDialogParams(void)          112
    SetupRuntimeParams(void)        114
    InternalData:                   116
                                    118
        AST[nParams];
        NumericDialogParamValues[nParams];    120
        RuntimeParams[nRunTimeParams];        122
    GetAstForDialogParam(int paramIndex)
    SetAstForDialogParam(int paramIndex, ast)
    GetNumericParamValues(int dialogParamIndex)
    SetNumericParamValues(int dialogParamIndex, value)
    GetNumRuntimeParams( )
    GetRuntimeParam(int runtimeParamIdx)      124
    SetRuntimeParam(int runtimeParamIdx, value)
}
```

HANDLING PARAMETERS IN BLOCK DIAGRAM MODELING

RELATED APPLICATIONS

This application is a divisional of, and claims the benefit of, co-pending U.S. patent application Ser. No. 11/253,896 filed on Oct. 19, 2005, which is a continuation of, and claims the benefit of, co-pending U.S. patent application Ser. No. 09/911,663 filed on Jul. 24, 2001, naming the same inventors and the same assignee as this application. The disclosure of the above-mentioned applications is hereby incorporated by reference herein in their entirety.

BACKGROUND

The invention relates to handling parameters in block diagram modeling.

Dynamic systems may be modeled, simulated and analyzed on a computer system using graphical block diagram modeling tools, e.g., Simulink® from The Math Works Inc. Graphical block diagram modeling graphically depicts mathematical relationships among a system's inputs, states, parameters, and outputs, typically through the use of graphical user interface.

In a graphical context, a block diagram is a directed graph containing nodes and arcs providing a means by which the nodes can communicate. In most block diagramming paradigms, the nodes are referred to as blocks and drawn using some for of geometric object (e.g., circle, rectangle, etc.) and the arcs are typically drawn using line segments connecting the geometric objects. These line segments are often referred to as signals. For example, some Simulink® block diagrams enable the user to model dynamic systems where each block represents a functional entity that mathematical operations and transformations on the data (variables) being processed by a system and therefore implements a set of equations. The signals represent a time-varying quantity that is updated, i.e., read-by and written-to, by the blocks. Within Simulink®, blocks execute using a predetermined ordering and with control-flow semantics. Other types of graphical block diagrams include data-flow block diagrams wherein blocks wait for data to be valid before they execute.

Within Simulink®, executing a graphical block diagram model refers to solving the equations defined by the nodes in the directed graph. The order of execution of the nodes is dictated by the direction of the arcs that connect the nodes. Graphs with strongly connected components (i.e., nodes that form cycles) can be executed by solving each cycle simultaneously as a coupled set of equations.

In theory, there can be a number of equations (often referred to as block methods) that are associated with a block. For example, Simulink® supports various types of block methods. One such block method is an output method, expressed in the form of $$y = \text{OutputMethod}(t,x,u,p)$$

where y is typically a set of block output signals (or some other forms of output, e.g., a logging device such as a plotting tool or a data archiving block), t is time, x represents a set of continuous states and discrete states, u represents the set of input signals to the block and p represents a set of parameters supplied to the block.

A user can parameterize a block with user-defined values by specifying the parameters p that are to be used by the block. For example, Simulink® allows a user to specify block parameters through a dialog box or programmatically via a 'set_param' command.

As indicated earlier, a parameter can take on a wide variety of attributes. In addition, a parameter can be defined as an expression. For example, for a gain block that has an output method $y = p*u$, where p represents a single parameter, a user could define the parameter p as a numeric quantity (e.g., 1:10), an expression of variables and functions, e.g., a*b+sin (c), or a combination of the two.

Using the equations defined by the blocks, block diagrams can be executed in an interpreted environment that produces a simulation result as defined by the blocks and signals in the model. In addition, code can be generated from the block diagrams and executed in an executive. The executive is often referred to as an execution framework for the generated code. It is responsible for executing the generated code by calling the entry points in the generated code at the right times.

SUMMARY

In one aspect, the invention provides methods and apparatus, including computer program products, for manipulating graphical block diagram block parameters in a graphical block diagram modeling environment. The methods include receiving a graphical block diagram of blocks for a model developed by a user and processing parameters specified for each of the blocks by the user to produce run-time parameters.

Particular implementations of the invention may provide one or more of the following advantages.

The parameter processing mechanism provides the ability to create optimized equations that use specific run-time parameter configurations derived from the dialog parameters entered by the user. For example, the parameter pooling makes optimal use of the constant data memory allocated to block parameters. Run-time parameter pooling achieves optimal data store (parameter data reuse) in both a simulation environment and in automatically generated code.

In addition to the pooling of constant parameters, a block can specify that a parameter it is using in its equation is constant, even if that parameter is specified by a user as an interfaced variable. Within block diagrams, user's can explicitly designate certain variables as interfaced and, therefore, in this context, an interfaced variable is a variable name that has been specified as a parameter or part of a parameter expression. Interfaced variables can be accessed and updated during block diagram simulation or in the resulting generated code for the block diagram while the generated code is executing. Marking a parameter as constant means that the interfaced variable will not be accessible and that the parameter values will be pooled, thereby enabling further parameter pooling. Under this scenario, the parameter processing mechanism can issue a warning informing the user of the situation.

The parameter processing mechanism also enables preservation of interfaced variables contained within parameter expressions in generated code. The ability to maintain the structure of parameter expressions in the generated code allows users of a block diagram tool to solve a larger class of problems. By maintaining the structure of expressions in this manner, more flexibility is afforded when a user's executive is running (calling) the generated code. The executive (execution framework) can probe and update the values of the interfaced variables.

The definition of run-time parameters and mapping of user-specified parameters to run-time parameters enables a graphical block diagram tool to produce optimal implementations of the block equations for a given user supplied data set. Users can also create their own blocks with block equations optimized for run-time parameters, thus enabling the user of a graphical block diagram tool to extend the parameter processing optimizations and mappings in simulation execution or automatically generated code to custom blocks.

Other features and advantages of the invention will be apparent from the following detailed description and from the claims.

DESCRIPTION OF DRAWINGS

FIG. 7 is a flow diagram of the operational flow of a compiler of the block diagram processing engine (shown in FIG. 6).

FIG. 8 is an exemplary block data structure illustrating parameter-related aspects of the block.

Like reference numerals will be used to represent like elements.

DETAILED DESCRIPTION

Figure 1:
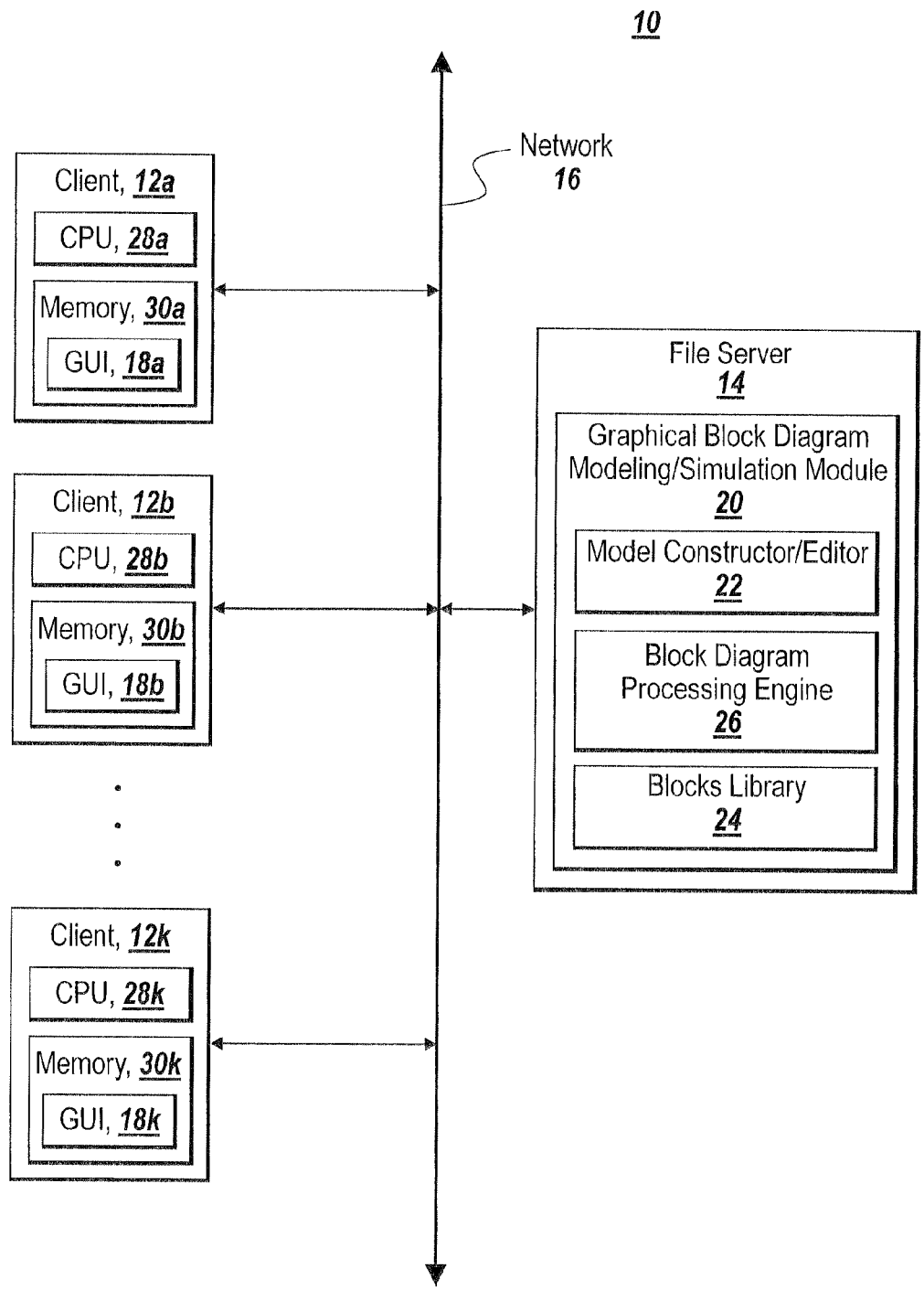
FIG. 1 is a block diagram of a system that includes a file server that stores a graphical block diagram modeling/simulation module that includes a model editor and simulator that supports block diagram parameter processing and client systems that access a file server and execute processes of the graphical block diagram modeling/simulation module for graphical block diagram model development and execution.

Referring to FIG. 1, a system 10 includes client systems 12a, 12b, . . . , 12k and a file server 14 each connected to a network 16, e.g., an Ethernet network, the Internet, or other type of network. Alternatively, instead of being connected to a network, the systems 12 and 14 could be interconnected by a system bus such as Fibre Channel. Each of the client systems 12a, 12b, . . . , 12k includes a graphical user interface (GUI) 18a, 18b, . . . , 18k. The file server 14 is configured with a graphical block diagram modeling and simulation module 20 (hereinafter, simply, "the module"), which is implemented in software. The module 20 includes a model constructor/editor 22, as will be described later. The module further includes a blocks library 24 and a block diagram processing engine 26. As will be explained more fully below, the model editor 22, in conjunction with the library 24, is used by a client system user to construct and display a graphical block diagram model which visually and pictorially represents a dynamic system of interest to that user. The block diagram processing engine 26 processes the block diagram model to produce simulation results or, optionally, to convert the block diagram model to executable code.

The system 10 illustrates a remote client access configuration in which the module 20 is installed on a central file server, i.e., the file server 14, and users of the client systems 12 access the module 20 over the network 12. In an alternative configuration, e.g., in an environment in which access to the library 24 is not shared by multiple users, the module 20 could be installed on a single stand-alone or networked computer system for local user access.

Each of the client systems 12a, 12b, . . . , 12k, includes a respective memory 30a, 30b, . . . , 30k, for storing all or accessed portions of the module 20, as well as a respective CPU 28a, 28b, . . . , 28k for executing the stored portions of the module 20, the GUI 18 and other OS programs (not shown) for controlling system hardware. Although not shown, it will be understood that the systems 12 and 14 can be, in other respects, of a conventional design and architecture. That is, the systems 12 include conventional system I/O peripherals, e.g., display, mouse, keyboard and the like, for enabling user interaction with the system. The file server 14 includes conventional server software and hardware and thus includes the appropriate storage for storing the software programs of the module 20, along with OS and server application programs, and CPU for executing those programs.

For illustrative purposes, the module 20 will be described within the context of a Simulink® and MATLAB® based simulation environment. Simulink® and MATLAB® are commercial software products available from The MathWorks, Inc. The Simulink® software package includes a number of different tools, such as special user interfaces and navigational tools, e.g., a library browser, which will be referenced in the description to follow. Further details of these tools and interfaces can be had with reference to available Simulink® and MATLAB® product documentation. It will be understood, however, that any other block diagram based modeling software platforms could be used such as the dataflow block diagram paradigm.

The module 20 enables users to copy graphical blocks into their models from the libraries 24 (or, optionally, from external libraries). Alternatively, or in addition, the module 20 allows a user to implement a custom (user-defined) block for use in a model and to add that custom block to the library 24 if the user so chooses. In a Simulink® product context, the custom, i.e., user written, blocks are known as "S-function blocks".

Figure 2A:
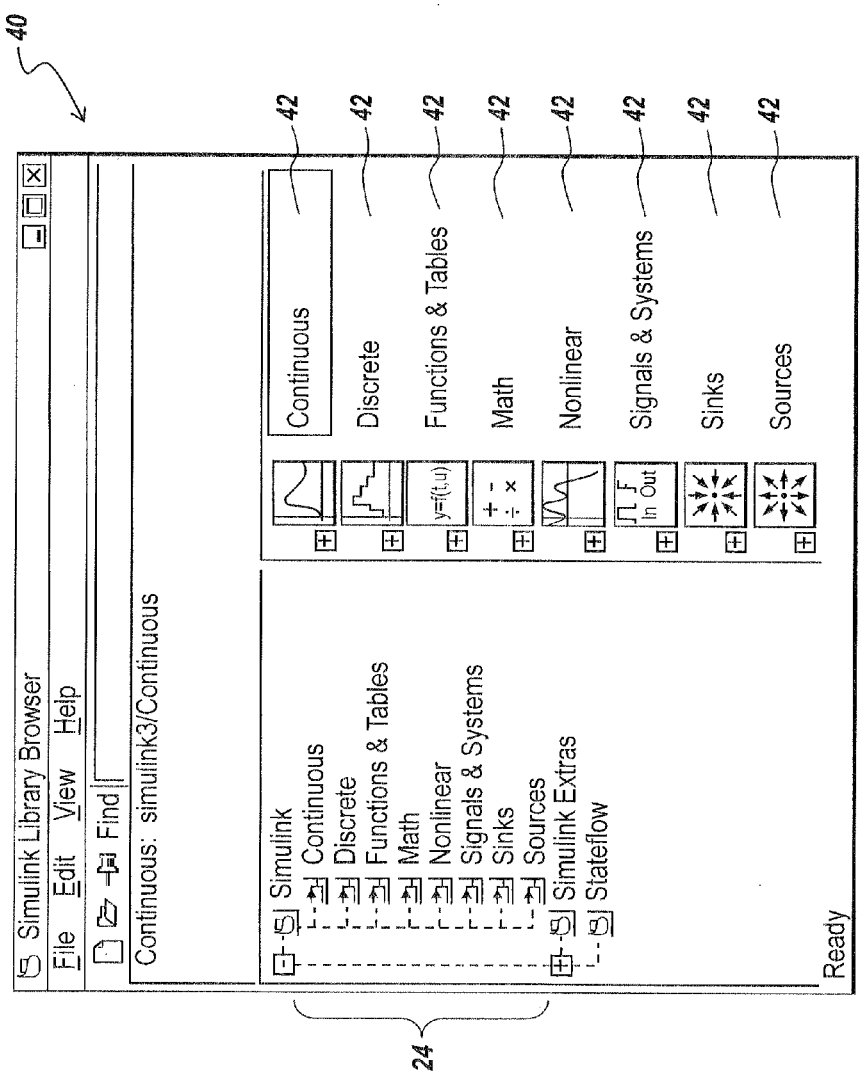
FIGS. 2A-B are depictions of an exemplary library of graphical blocks libraries provided by the graphical block diagram modeling/simulation module (of FIG. 1) and available for use in developing and executing a graphical block diagram model.
Figure 2B:
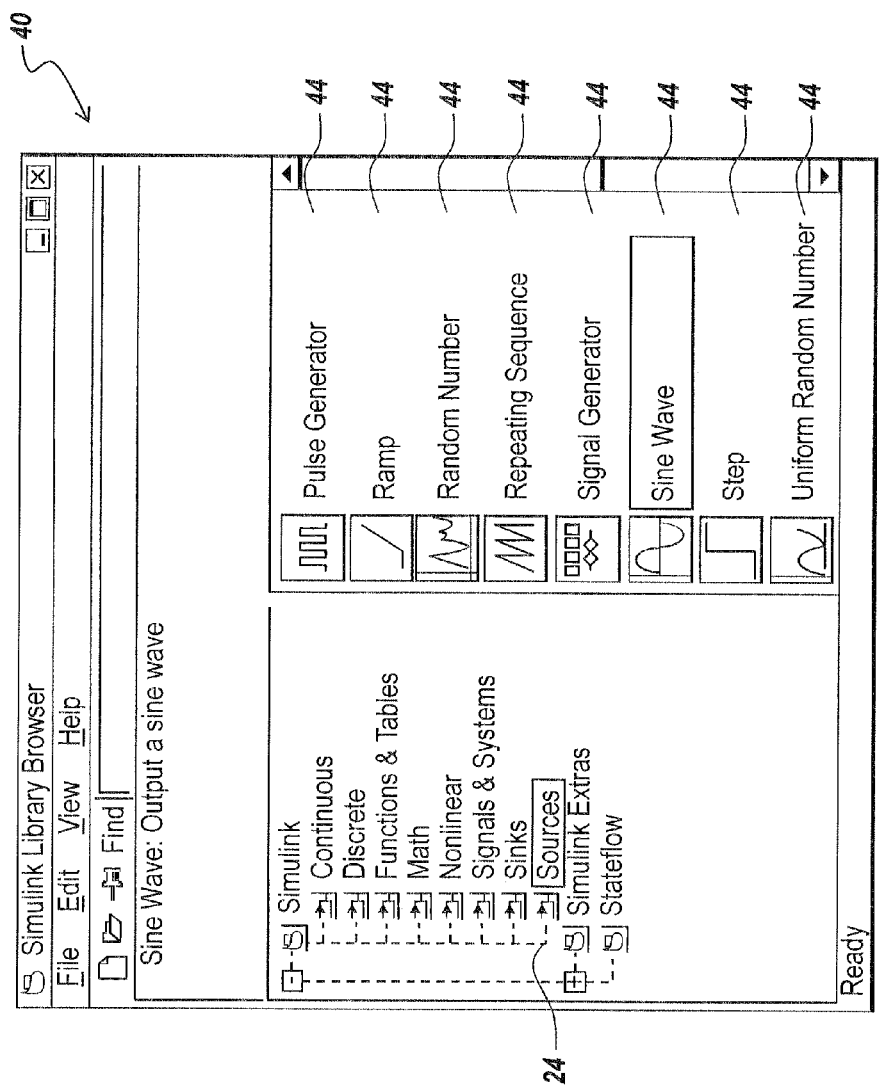

FIGS. 2A-2B provide screen shot depictions of an exemplary embodiment of the library 24 as a Simulink® library as presented in a window of a Simulink® library browser 40. As shown in FIG. 2A, the library 24 is a collection of libraries 42 each corresponding to different groupings or categories of blocks. It will be appreciated that the libraries are represented within the context of the library browser's tree structure as nodes or icons. As shown in FIG. 2B, each library 42 includes a set of one or more blocks 44. In the particular example shown in FIG. 2B, a user has selected a "sources" library, which includes among the members of its set of graphical source blocks the graphical blocks "pulse generator", "ramp", "random number", "repeating sequence", "signal generator", "sine wave", "step" and "uniform random number". These blocks all represent signal generator functionality and are therefore grouped together in the sources library. Thus, a user operating one of the client systems 12 uses the blocks 44, for example, the sine wave block, to build a graphical block diagram using the model editor 22.

A user selects blocks using a menu provided by the library browser 40. Having opened a model window for a model to be generated and/or edited, the user copies the selected blocks from the library window to the model window, e.g., by selecting ("clicking on") a corresponding library node or icon, dragging the block from the library browser and dropping it in the model window.

Figure 3:
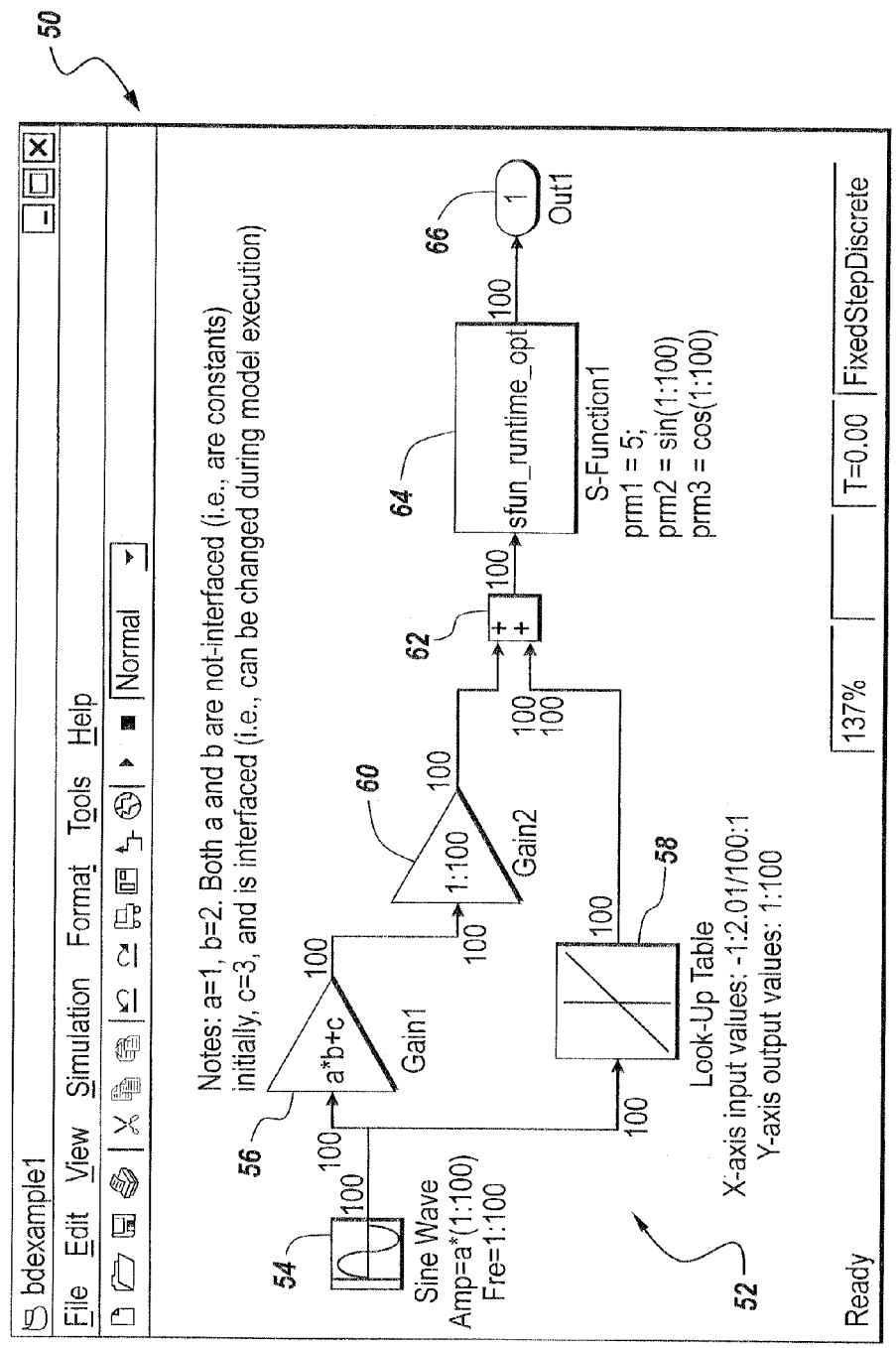
FIG. 3 is an exemplary screen display from a GUI of a client system executing the model editor of the graphical block diagram modeling/simulation module (of FIG. 1) during graphical block diagram model development.

FIG. 3 illustrates a Simulink® model window 50 that displays an exemplary block diagram model 52 created by a user using the model editor 22. The block diagram model 52 includes a sine wave block 54 that drives a first gain ("gain1") block 56 and a lookup table block 58. The gain1 block 56 feeds a second gain ("gain2") block 60. The gain2 and lookup table blocks 60, 58, respectively, in turn provide inputs to a sum block 62, the output of which is provided as an input to an S-function block ("S-Function1") 64. The output of the S-function block 64 is provided to an outport block (Out1) 66.

Each of the blocks in the model 50 implements a specific operation (i.e., an algorithm or equation). In general, the equations defined by the blocks include user specified parameters. As indicated above, the user-specified parameters are expressions that may be in the form of numerical values, variables defined as constants, interfaced variables or some combination thereof. An interfaced variable is a variable whose value can be changed either during simulation or in generated code, as will be discussed in further detail later.

For example, the output method for the S-function block 64, in the form y=u*p, where output y is 'sfun1_out', input u is the output of the sum block 62 'sum_out' and parameter p is a parameter expression 'prm1+(prm2−prm3)', is 'sfin1_out=prm1+(prm2−prm3)*sum_out'. The variables prm1, prm2 and prm3 each are user-specified parameters: A pseudo code example for the entire block diagram model 52 is as follows:

ExecutionLoop:
      sine_out=sin(t);
      gain1_out=sine_out.*gain1_parameter;
      gain2_out=gain1_out.*gain2_parameter;
      look-up_out=sine_out.*look-up_parameter;
      sum_out=gain2_out+look-up_out;
      sfun1_out=prm1+(prm2−prm3)*sum_out;
      t=t+step_size;
   EndExecutionLoop;

The model code is written using vector notation, e.g., the gain1_out=sine_out.*gain1_parameter is an element-wise operation. The use of a vectored language is not required, however. Other "non-vectored" languages, such as C, could also be used. For example, if the code for the gain1 block 56 output method were to be written in a non-vectored language such as C, the code would look like

```
{
  int i;
  for (i=0; i<100; i++) {
    gain1_out[i]=sine_out[i]*gain1_parameter[i];
  }
}
``` where the gain1 block parameter 'gain1_parameter' is assumed to have been declared as a vector of 100 elements initialized to the values 1, 2, 3, 4, 5, . . . , 100. In vector notation, 1:100 declares an array of length 100 with values 1, 2, 3, 4, 5, . . . , 100.

The library 24 is a repository of classes that correspond to the blocks. When a graphical class is used in a model, it is said to be instantiated, i.e., an instance of the graphical class is created for use in the model. Such an instance is a link to the graphical class that resides in the library. Block parameters are class members that are specified when a user constructs a new instance of a class. Instances associated with the class have parameter specification interfaces that allow users to define the block parameters. On a GUI, such parameter specification interfaces take the form of a dialog box with various parameter fields. Thus, the user supplies the block parameters to the block method for the appropriate block through a dialog box associated with the block. Alternatively, the user can specify parameter values programmatically using a command (e.g., the Simulink® 'set_param' command). Each block in the block diagram model 52 can have between 0 and N parameters that are specified by a user for use in the block methods for those blocks.

As noted earlier, the user-specified parameters are expressions that may be in the form of numerical values (e.g., "10"), variables defined as constants (e.g., "a" where a=10), interfaced variables (e.g., "a") or some combination thereof (e.g., a*b*sin(c)). The following examples are valid input for the gain parameter of the gain block, such as gain blocks 56 and 60, as shown in FIG. 3.

Gain: 1.5 A scalar gain value.
   Gain: a*b+c A gain value defined as an expression of
      variables: a, b, and c.
   Gain: [1 2 3; 4 5 6] A 2×3 matrix of gain values.
   Gain: [1:100] A vector of gain values 1, 2, 3, . . . , 100.
   Gain: a*[1:100] A variable a multiplied by a vector of gain
      values 1, 2, 3, . . . , 100.

As shown in FIG. 3, the gain1 block 56 is implemented to use a block parameter defined as an expression 'a*b+c' (where a and b are constants, i.e., non-interfaced, and c is an interfaced variable therefore capable of being changed during model execution), whereas the gain2 block 60 is implemented to use a block parameter defined as a vector of gain values 1, 2, 3, . . . , 100.

In addition to the user-specified parameters (e.g., dialog parameters), the user also supplies to the module 20 a list of all interfaced variables used by the block methods. The list provided by the user designates a variable, for example, variable c in the gain1 block 56, as interfaced and provides various attributes (data type, dimensionality, complexity, storage class, and so forth) for each variable designated as an interfaced variable.

Figure 4:
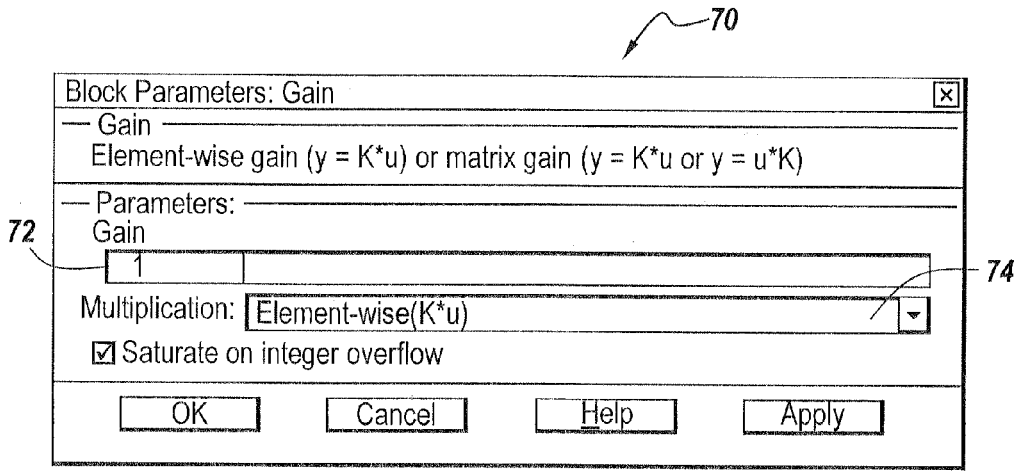
FIG. 4 is an exemplary block parameter dialog box in which a user specifies parameters expressions.

FIG. 4 is an exemplary block parameter dialog box 70 for the gain2 block 60 (of FIG. 3). The dialog box 70 includes a first parameters field 72 for specifying a parameter value, in the example, a gain value or range of gain values. The dialog box 70 also includes a second parameters field 74 for specifying the type of gain multiplication, that is, element-wise or matrix-wise, to be performed by the gain2 block 60.

The module 20, and more particularly, the block diagram processing engine 26, generates and supports the use of run-time parameters. Run-time parameters are the block parameters that are used during execution of the block diagram model or in generated code. They are derived from user-specified parameters. The run-time parameters can be the same as the user-specified parameters, but in many cases will be different. Whether there is a one-to-one correspondence between the dialog parameters and the run-time parameters will depend on whether a block equation parameter expression "p" can, be simplified for optimization, as will be discussed more fully below.

Figure 5:
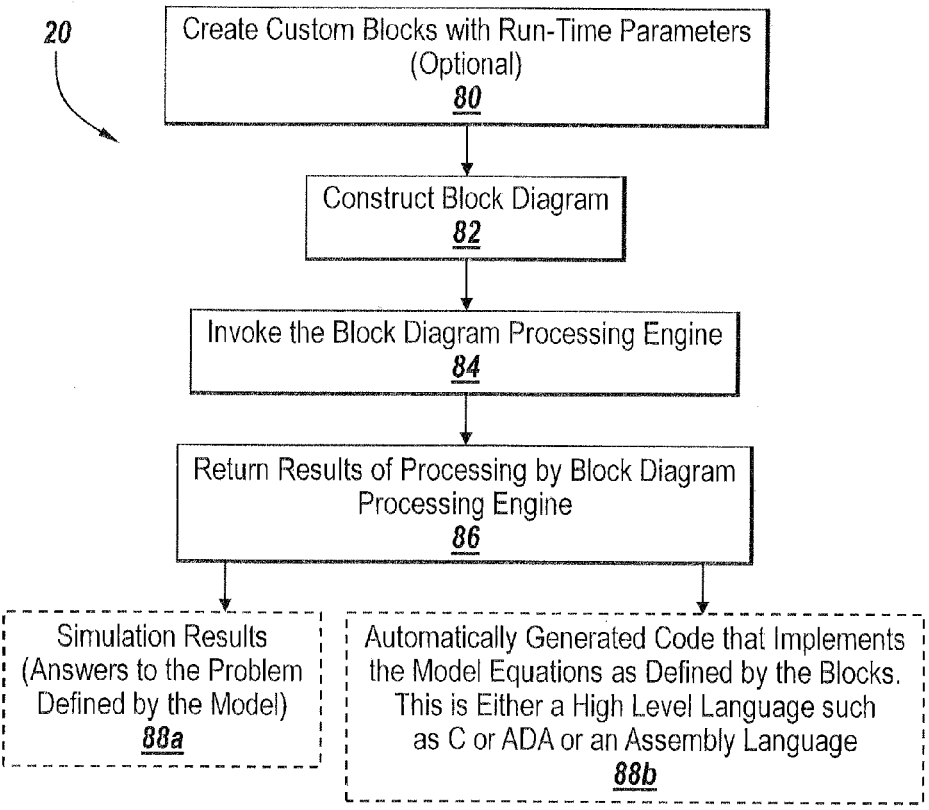
FIG. 5 is a flow diagram of the operational flow of the module shown in FIG. 1.

FIG. 5 depicts a flow diagram of the operational flow of the module 20 and its internal components. Optionally, processing of the module 20 begins by enabling a user to create custom blocks (e.g., the S-function block 64 of FIG. 3) with run-time parameters (step 80). If the user is using only the pre-packaged blocks provided by the module's library 24, or if all desired custom block definition is complete, the module 20, and more particularly, the model editor 22, enables the user to construct a block diagram model using the blocks (pre-packaged, custom or combination of the two) (step 82). Once the model has been built (and, preferably, saved in memory), the module 20 invokes the block diagram processing engine 26 (step 84). The block diagram processing engine 26 takes as inputs the graphical description of the model (that is, the blocks and lines) and processes those inputs by either executing the model or, alternatively, generating code that implements the model equations defined by the blocks of the block diagram model. Consequently, the module returns as output the results of the processing by the block diagram processing engine 86, more specifically, either simulation results if the model is executed (indicated in dotted, lines by the reference numeral 88a), or the automatically generated code (indicated in dotted lines by the reference numeral 88b). The generated code can be deployed to a target application.

Figure 6:
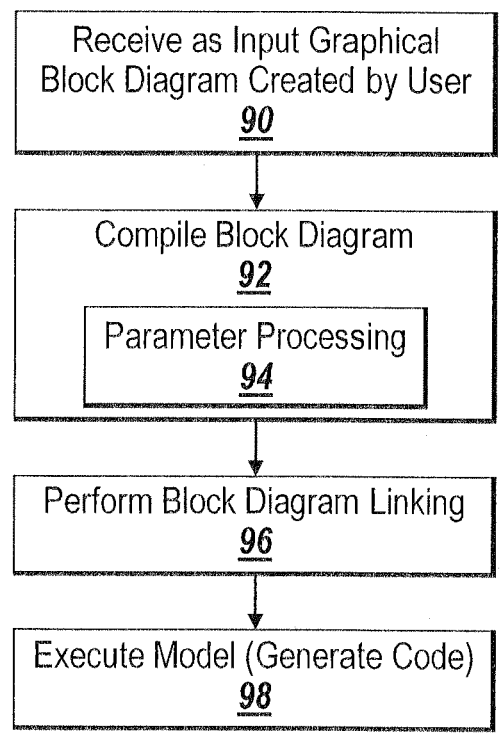
FIG. 6 is a flow diagram of the operational flow of a block diagram processing engine that processes block diagram block parameters specified by a user.

Referring to FIG. 6, the operational flow of the block diagram processing engine 26 is shown. The engine 26 receives the user's block diagram model as an input (step 90) and compiles the block diagram of the block diagram model (step 92). The compiler phase 92 determines the appropriate order of the blocks and transforms the graphical block diagram into a set of executable instructions (or operations). During this transformation, any invalid modeling specifications (such as an invalid parameter expression) are reported as errors and the compilation stops. A portion of the compiler phase 92 of the block diagram processing engine processing relates to processing of parameters 94 for parameter optimization and parameter expression mapping, as will be described. The engine 26 also includes a linker that, given the order of the equations as determined by the compiler phase 92, links and allocates appropriate working areas in memory to the equations (instructions) to enable execution of the model (run a simulation) or code generation code (step 96). The engine 26 executes the model to produce simulation results (or, alternatively, generates executable code) (step 98).

Referring to FIG. 7, the operation of the parameter processing portion 94 of the compiler phase 92 (hereinafter, parameter processor 94) is as follows. For each block in the block diagram, the parameter processor 94 evaluates the block's user-specified parameters (e.g., dialog box block parameters), if any (step 100). The evaluation determines numerical values of parameter expressions specified by the user (e.g., entered by the user in the dialog box parameter fields) and constructs a data structure to describe each parameter expression that contains an interfaced variable. Thus, the data structure captures the interfaced, as well as any non-interfaced, variables for each user-specified parameter expression. Also, for each block in the block diagram, the parameter processor 94 sets up and maintains run-time parameters for the blocks (step 102). That is, the parameter processor 94 makes a call to the blocks to set up run-time parameters. In response, the blocks define run-time parameters, map the run-time parameters to the user-specified parameters and register the run-time parameters with the block diagram processing engine 26. The registration provides the engine 26 with information describing each blocks use of run-time parameters, e.g, the number of run-time parameters used, run-time parameter values and other attributes, as well as mapping information.

Using the information from the evaluation and run-time parameter setup steps 100, 102, respectively, all parameter attributes that are accessed by each block method can be collected and processed by the block diagram processing engine 26. More specifically, the parameter processor 94 pools together like run-time parameters that are non-interfaced, that is, remain constant during model execution or do not change in the generated code (step 104). After parameter pooling, the parameter processor 94 creates a run-time parameter expression execution structure that allows interfaced variables in run-time parameter expressions to be accessed during model execution (e.g., for purposes of updating) or mapped to generated code (step 106).

The parameter processing steps will be described in greater detail with reference to FIGS. 8-14.

Referring to FIG. 8, a block data structure 110 used by the parameter processing 94 is shown. The block data structure 110 only illustrates those aspects of a block that pertain to parameters and parameter processing. Attached to the block data structure 110 are functions 112 and 114 for evaluating dialog parameters ("EvalDialogParams( )") and setting up runtime parameters ("SetupRuntimeParams( )"), respectively. In C, these functions would be realized as function pointers within the block data structure 110. In C++, each of these functions would be a class method of the block class. The block data structure 110 further includes an internal data array 116 ("InternalData"). The internal data array 116 includes the following: an array of abstract syntax trees (ASTs) 118, one for each block parameter field; an array of numerical values ("NumericDialogParamValues[nParams]") 120, which is an array of numerical objects each representing the evaluated value of the block parameter expression; and an array of runtime parameters 122 ("RuntimeParams[nRuntimeParams]"). The runtime parameters array 122 is an array of parameters which are used by the block during execution. Also attached to the data structure 110 are various other methods or functions (used by the parameter processing 94), including a GetRuntimeParam method 124, which is used by the parameter pooling 104, as will be described.

Figure 9:
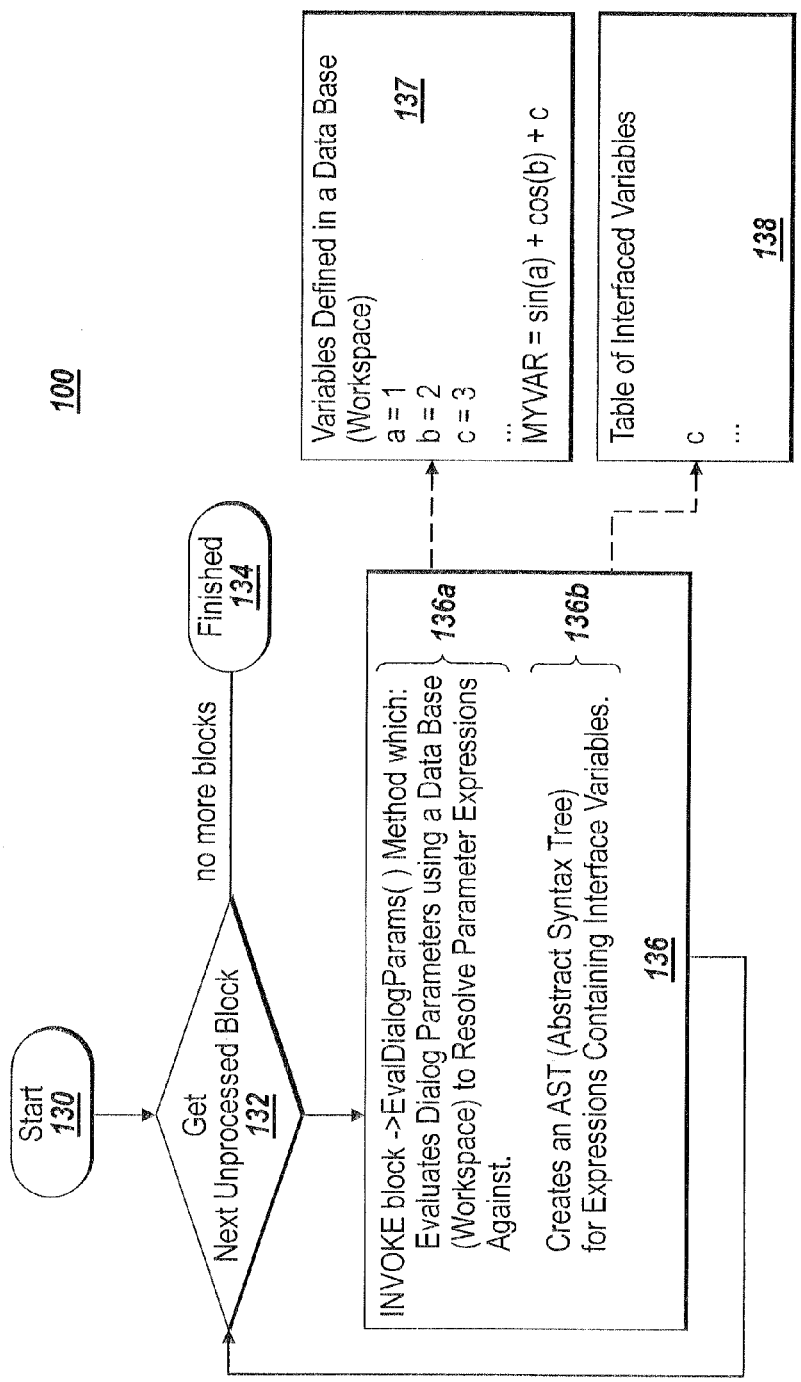
FIG. 9 is a flow diagram of the dialog parameter evaluation/processing step (from FIG. 7).
Figure 10A:
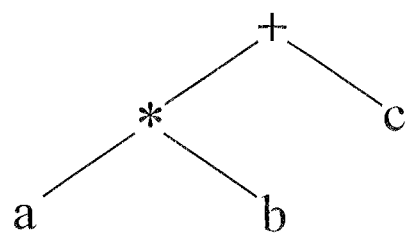
FIGS. 10A and 10B are exemplary depictions of an Abstract Syntax Tree generated by the dialog parameter evaluation (shown in FIG. 9).
Figure 10B:
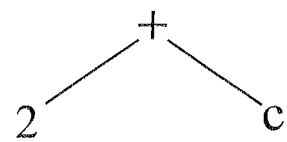

Referring to FIG. 9, details of the block parameter evaluation process 100 (from FIG. 7) are shown. The process 100 begins (step 130) by proceeding to the next unprocessed block (step 132). If there are no more-blocks to be processed, the process 100 terminates (step 134). If there is at least one more block yet to be processed, the process 100 invokes the block EvalDialogParams( ) method 112 (shown in FIG. 8) (step 136). The method 112, once invoked, evaluates dialog parameters in parameter expressions to resolve those parameter expressions for their numeric values (step 136a). The results are stored in the NumericDialogParamValues [nParams] array 120 (from FIG. 8). This evaluation uses a workspace (shown as shaded block 137) where the variables as well as the expressions are defined. For example, if a parameter expression 'a*b+c', and the variable values are defined in the workspace as a=1, b=2 and c=3, the evaluation results in a value of 5. The invoked method 112 also creates an AST for any parameter expressions containing interfaced variables, collapsing nodes for any portion of a parameter expression containing non-interfaced variables for more efficient storage (step 136b). The method 112 uses a table of interfaced variables (shown as shaded block 138) to determine the interfaced values. The table 138 shows a variable c as an interfaced variable. Thus, and referring to FIG. 10A, an AST 140 created for the block parameter expression 'a*b+c', in which variable c is determined to be interfaced. A simplified version of the AST 110 is shown in FIG. 10B as AST 142. The AST 142 is derived from the AST 110 by collapsing the non-interfaced nodes a and b of AST 110 into a single node representing the product a*b. In this example, if a=1 and b=2, the result of multiplying the values of the variables a and b is the value '2'.

Figure 11:
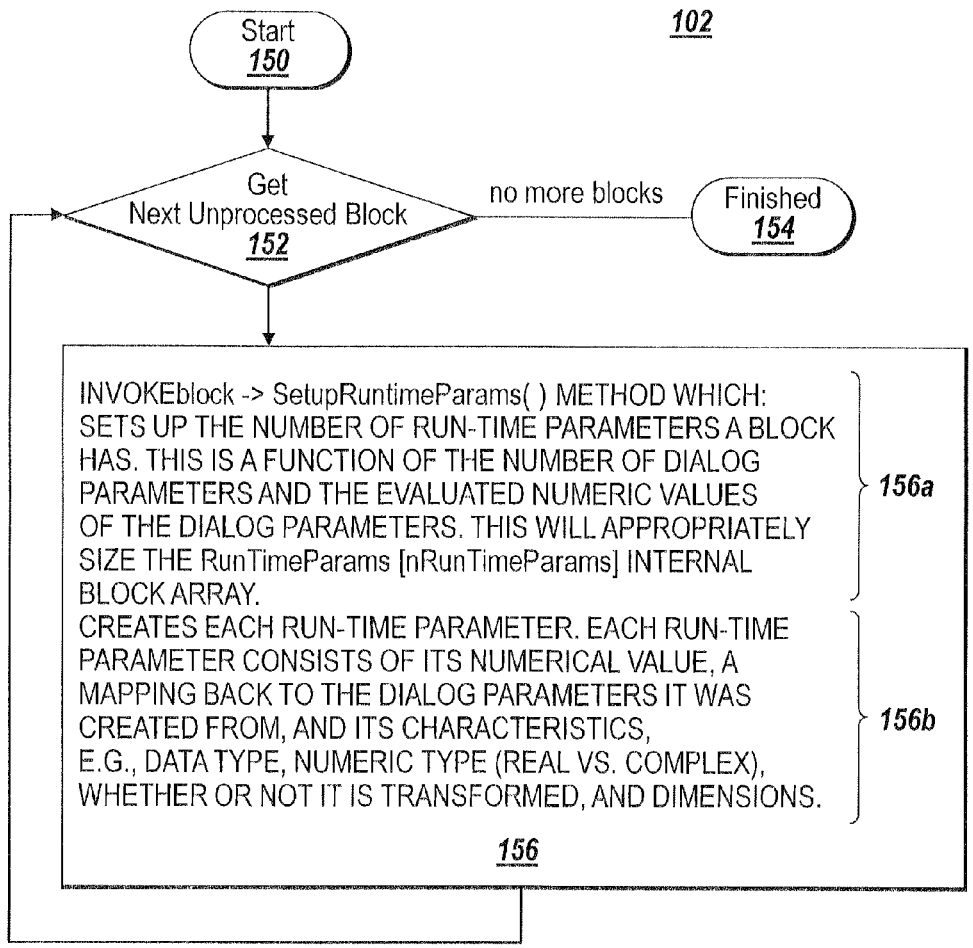
FIG. 11 is a flow diagram of the run-time parameters setup process (from FIG. 7)

Referring to FIG. 11, details of the runtime parameter setup process 102 (from FIG. 7) are shown. The process 102 begins (step 150) by proceeding to the next unprocessed block (step 152). If there are no more blocks to be processing, the process 102 terminates (step 154). If there is at least one more block yet to be processed, the process 102 invokes the SetupRuntimeParams( ) method 114 (shown in FIG. 8) (step 156). The method 114 sets up the number of run-time parameters uses by a block (step 156a). The number of run-time parameters is a function of the number of dialog parameters and evaluated numeric values of the dialog parameters. The setup step 156a appropriately sizes the block's RuntimeParams[nRunTimeParams] runtime parameters data array 122 (shown in FIG. 8). The method 114, as invoked, also creates each run-time parameter and stores information defining the run-time parameter in the runtime parameters data array 122 (step 156b). The run-time parameter information includes a numerical value, a mapping back to the dialog parameters/parameter expression from which it was created, and the run-time parameter's characteristics (e.g., data type, numeric type (real vs. complex), whether or not the parameter is transforms (as will be later described), and dimensions. Other characteristics may be stored in association with the run-time parameter as well.

Figure 12:
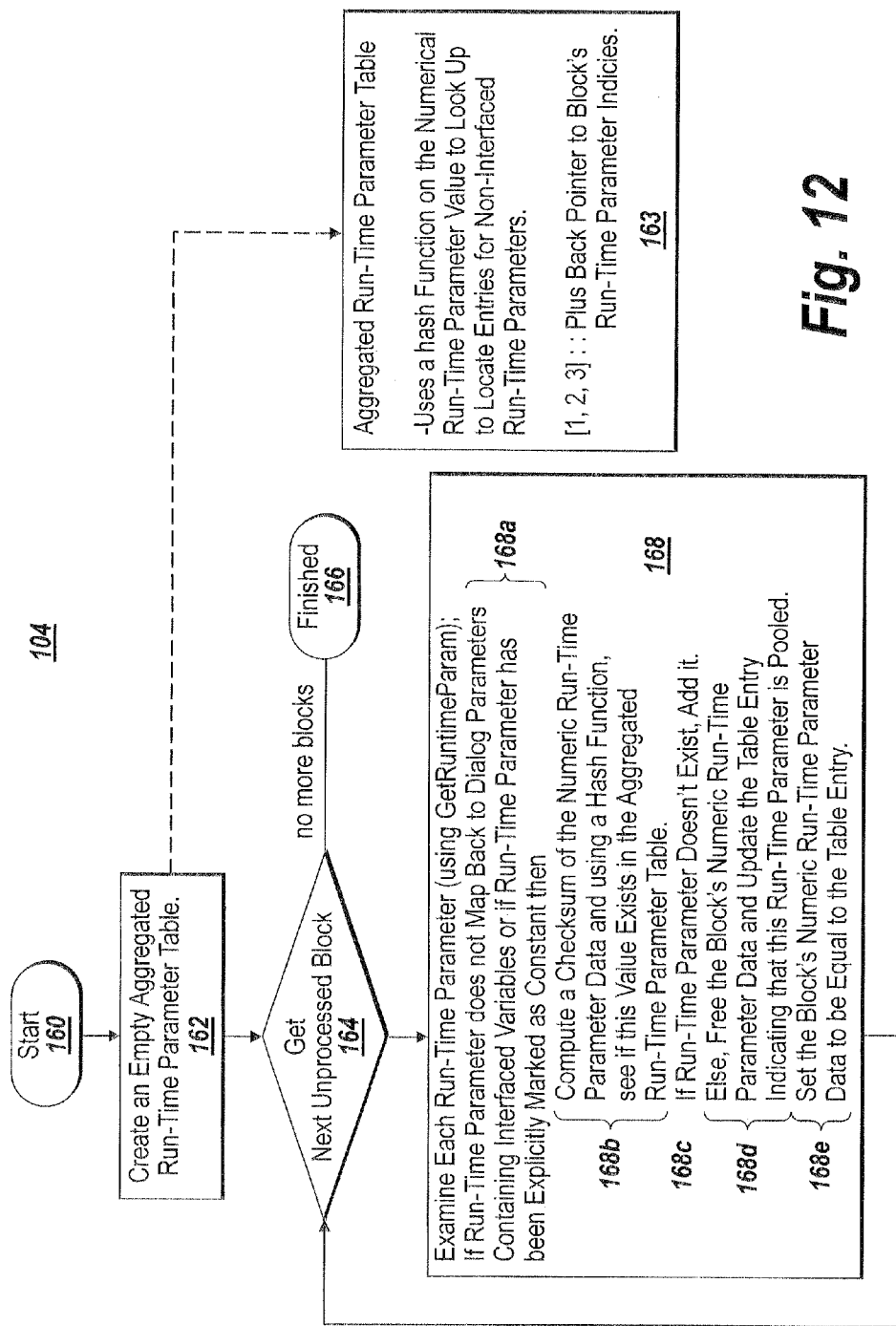
FIG. 12 is a flow diagram of the parameter pooling process (from FIG. 7).
Figure 13:
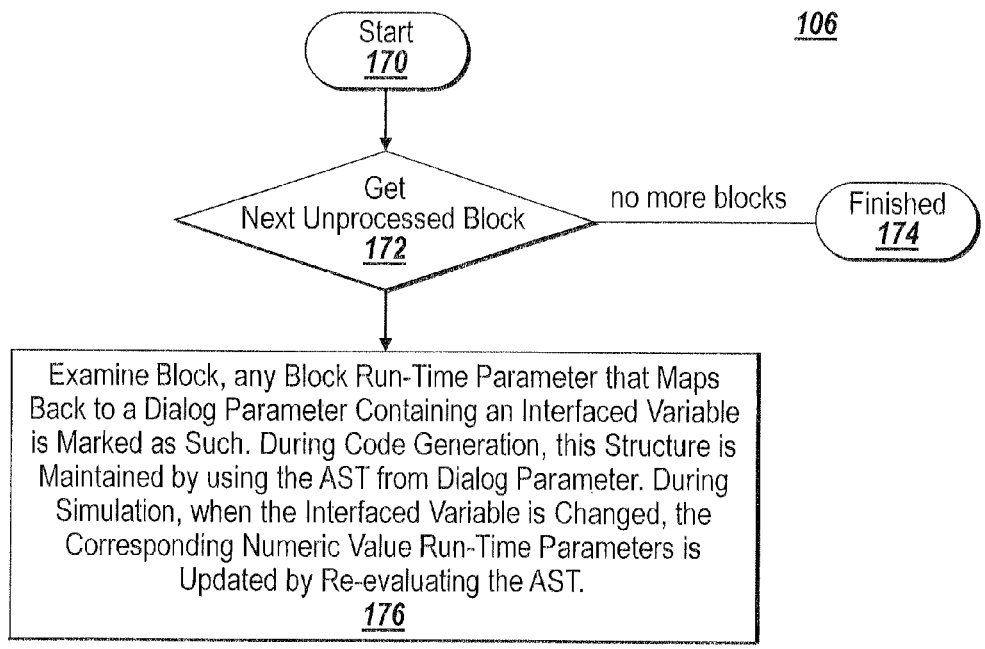
FIG. 13 is a flow diagram of the execution structure setup process (from FIG. 7).

Referring now to FIG. 12, the parameter pooling process 104 (from FIG. 7) begins (step 160) by creating an empty aggregated run-time parameter table (step 162). The aggregated run-time parameter table is shown as shaded block 163. The process 104 proceeds to the next unprocessed block (step 164). If there are no more blocks to be processing, the process 104 terminates (step 166). If there is at least one more block yet to be processed, the process 104 invokes the method GetRuntimeParam 124 (shown in FIG. 8) (step 168) to examine each run-time parameter and perform parameter pooling to the extent possible. More specifically, if the process 168 determines that the run-time parameter does not map back to dialog parameters containing interfaced variables or if the run-time parameter has been explicitly marked as a constant (step 168a), the process/step 168 performs the following steps. The process 168 computes a checksum of the numeric run-time parameter data and, using a hash function, determines if this value exists in the aggregated run-time parameter table (step 168b). If the run-time parameter does not exist in the aggregated run-time parameter table, it is added to the table (step 168c). If it already exists in the table, the process 168 frees the block's numeric run-time parameter data and updates the table entry indicating that this run-time parameter is pooled (step 168d). It sets the block's numeric run-time parameter data to be equal to the table entry (168e). In an alternative implementation, the aggregated run-time parameter table could be created as the dialog parameters were being processed.

Referring to FIG. 11, details of the execution structure setup process 106 (from FIG. 7) are shown. The process 106 begins (step 170) by proceeding to the next unprocessed block (step 172). If there are no more blocks to be processing, the process 106 terminates (step 174). If there is at least one more block yet to be processed, the process 106 examines the block to determine if the block has a run-time parameter that maps back to a dialog parameter containing an interfaced variable and, if the block is a block that has such a run-time parameter, marks the block as such (step 176). During code generation, the structure of any block so marked is maintained by using the AST from the dialog parameter evaluation. During simulation, when the interfaced variable is changed, the corresponding numeric value of the run-time parameter is updated by re-evaluating the AST.

The parameter processing steps 100, 102, 104, 106 will be further described in the paragraphs to follow.

As discussed above, each of the blocks in the block diagram model is responsible for defining a mapping of run-time parameters (to be used by the block methods during model execution) to user-specified parameters. This mapping is registered with the block diagram processing engine 26 during the setup run-time parameters phase 102 of the parameter processing 94. The block diagram processing engine 26 works in conjunction with the blocks to manage the run-time parameters on behalf of the blocks. This management activity includes determining where to store the data for the run-time parameters and managing changes to parameters that occur during model execution (for example, to ensure block parameter integrity). The run-time parameter configuration methodology of the parameter processor 94 therefore, enables blocks to rewrite their equations to achieve optimal realization. This rewriting can be done either statically, a priori to knowing parameter data values or dynamically after parameters data values become known or change.

While a parameter is considered interfaced if the user has defined the parameter in terms of interfaced variables, a block can override that definition. That is, the block can explicitly specify that a parameter that includes a variable declared by the user to be interfaced is non-interfaced by specifying that the corresponding run-time parameter is a constant. This type of run-time parameter can be referred to as an explicit constant run-time parameter.

The manner in which the blocks define run-time parameters and map run-time parameters to dialog parameters will now be described. The blocks define a mapping function or method that maps from run-time parameters to the dialog parameters. For example, the output method, y=OutputMethod(t,x,u,p), for the S-function block 60 (of FIG. 3) having three parameters (prm1, prm2, and prm3) is defined to be:

$$y=prm1+(prm2-prm3)*u$$

This output method or equation can be rewritten internally by the block as $$y=rtprm1+(rtprm2)*u$$

where run-time parameters, 'rtprm1' and 'rtprm2', are defined as 'prm1' and 'prm2−prm3', respectively.

The mapping function or method is called whenever the user changes the block parameters during model execution. The mapping of run-time parameters to dialog parameters can be any arbitrary function.

The block registers its run-time parameter definitions with the block diagram processing engine 26. Fore example, the block may register that a parameter maps one-to-one with a dialog parameter (e.g., rtprm1=prm1). Alternatively, the registration could indicate a one-to-one mapping, but that the parameter is transformed, i.e., stored in a different data format. That is, a block can mark that its run-time parameter is transformed and tunable (i.e., interfaced). This block-level parameter specification allows the user to enter parameter information in a method that contains high-level abstractions, e.g., representing a real-world value by the using of a floating-point data type, as the block can convert it to a more efficient data store representation, e.g. an integer data type. The nodes of the AST that are specified as interfaced will be accessible in the generated code and will be represented by the efficient data storage representation. A transformed interfaced variable therefore has one representation in the block parameter specification and another representation in the generated code.

An exemplary data structure for defining run-time parameters in the Simulink® context is as follows.

```
#ifndef _SS_PARAM_REC
#define _SS_PARAM_REC
/*
*Typedef for the enumeration that keeps track of the "transformed"
* status of run-time parameters.
*/
typedef enum {
    /*
    * The run-time parameter is not transformed if nDialogParamIndices
    is
    * one and there was no alteration of the dialog parameter
    */
    RTPARAM_NOT_TRANSFORMED = 0,
    /*
    * The run-time parameter is transformed if nDialogParamIndices
    > 1 or
    * there was an alteration of the dialog parameter value or data type.
    */
    RTPARAM_TRANSFORMED = 1,
    /*
    * The run-time parameter can be marked as 'make transformed
    tunable'
    * if nDialogParamIndices is one and you altered the dialog parameter
    * value or data type. If the parameter field contains a single
    * tunable variable, say 'k', than the transformed data type, etc:
    * version of k will be used in the generated code. All references to
    * tunable parameters that have been transformed must be done so in
    * the same fashion, otherwise an error will be generated.
    */
    RTPARAM_MARK_TRANSFORMED_TUNABLE = 2
} TransformedFlag;
typedef struct ssParamRec_tag {
    /*
    * The parameter characteristics
    */ --
    const char    *name;        /* Name of the parameter. This must
                                   point
                                 * to persistent memory. Do not set
                                   to a local
                                 * variable (static char name[32] or
                                   strings
                                 * "name" are okay)
                                 */
    int_T         nDimensions;  /* Number of dimensions    */
                                 for this parameter
    int_T         *dimensions;  /* Array giving the
                                   dimension (sizes) of
                                 * the paramter             */
    DTypeId       dataTypeId;   /* For built-in data types,
                                   see BuiltInDTypeId
                                 * in simstruc_types.h      */
    boolean_T     complexSignal; /* FALSE or TRUE           */
    /*
    * The data pointer. This is the data values for the run-time parameter.
    * Simulink needs this when creating the model.rtw file. Complex
    Simulink
    * signals are store interleaved. Likewise complex run-time parameters
    * must be stored interleaved.
    *
    * Note that mxArrays store the real and complex parts of complex
    * matrices as two separate contiguous pieces of data instead of
    * interleaving the real and complex parts. */
    void          *data;
```

-continued

```
/*
* The data attributes pointer is a persistent storage location where the
* user can store additional information describing the data and then
* recover this information later (potentially in a different function).
*/
const void *dataAttributes;
/*
* Run-time parameters to dialog parameter map.
*
* For proper interaction with tunable parameter variables' that
* are set via the "Tunable Parameters Dialog", Simulink requires
* information about how the run-time parameters are derived.
*
* It is an implicit assumption that all run-time parameters are derived
* from the dialog parameters, i.e., ssGetSFcnParam(S,i). Thus each
* run-time parameter is derived from a subset of the dialog
parameters:
* run-time_parameter = some_function(subset of dialog parameters).
* In the simplest case,
* run-time_parameter =a specific dialog parameter
* --
* The following information specifies which dialog parameters are
* used in deriving a specific run-time parameter. For the simplest
case,
* we have
*       nDialogParamIndices =1;
*       dialogParamIndices = k;
*       transformed = false;
* This case is important to identify because this will allow for
* efficient and correct code generation of run-time parameters when
they
* map directly back to tunable parameter variables specified in
* the 'Tunable Parameters Dialog'.
*/
int_T         nDlgParamIndices;
int_T         *dlgParamIndices;   /* Array of length nDialog-
                                     ParamIndices
                                   * indicating the dialog param-
                                     eters that
                                   * are used in deriving the run-
                                     time
                                   * parameter */
Transformed;  Flag transformed    /* Transformed status */
boolean_T     outputAsMatrix;     /* Write out parameter as a
                                     vector (false)
                                   * [default] or a matrix (true)
                                   */
} ssParamRec;
#endif
```

The mapping information (ssParamRec→ nDlgParamIndices, ssParamRec→nlgParamIndices) is used in setting up the expression mapping of the interfaced variables. In creating the run-time parameter, an initial value is specified (ssParamRec→data). The initial value is used in parameter pooling step.

As mentioned above, parameter pooling only applies to the constant run-time parameters. A run-time parameter is designated as constant if either of the following conditions hold: i) the run-time parameter does not map back to a dialog parameter that contains an interfaced variable; or ii) the run-time parameter is explicitly declared as constant by the block (as discussed earlier).

Generally, the parameter pooling step 104 identifies block parameters having parameter data that matches a given criterion, and allocates only one copy of the parameter data for all references to a given parameter data set. The criterion can require that the data match bit-for-bit. Parameter pooling that uses such an "exact data match" matching criterion is referred to herein as "uniform parameter pooling". Alternatively, the criterion can require that the data match exactly (i.e., bit-for-bit) only after a mapping function has been applied to the data. This latter type of parameter pooling is referred to herein as "non-uniform parameter pooling." Consequently, when non-uniform parameter pooling is employed, a block reconstructs the parameter data it needs for execution from the pooled parameters by using the mapping function during execution.

The uniform parameter pooling requires an identical data matching. If the values of the constant run-time parameters are bit-for-bit the same, then the block diagram processing engine 26 creates one memory location for the run-time parameter references. This memory location is referred to as a pooled parameter. The uniform parameter pooling looks for all registered run-time parameters with the same value and other attributes (i.e., data type, dimension, and so forth) and combines them into one run-time parameter in one location.

Non-uniform parameter pooling occurs when a one-to-one function is used to match data. The block is responsible for registering the data-matching function with the block diagram processing engine 26 during run-time parameter setup. The block diagram processing engine 26 may also have a set of predefined data-matching functions. The block diagram processing engine 26 is responsible for invoking these data-matching functions on the run-time parameters to see if the run-time parameters are identical. For example, suppose that a first block A is using a first constant run-time parameter 1:100, a vector of length 100 with values 1, 2, ..., 100, and a second block B is using a second constant run-time parameter 2:2:100, a vector of length 50 with values 2, 4, ..., 100. A data matching function takes the two constant run-time parameters as input arguments and returns true (success) if it finds a mapping between the two parameters. One of the arguments, say a first argument (my_rt_prm), is the run-time parameter of block B and the other argument, say a second argument (rt_prm), is a potential constant run-time parameter, such as the run-time parameter of block A, with which the block B may be pooled.

Suppose that block B defines the data matching function to be as follows:

Pmap(my_rt_prm, rtprm)
   If (DataElementTypesMatch(my_rt_prm,rtprm)) and AnIndexExistsThatMapsBetweenPrms(my_rt_prm, rtprm)) then
     Return true;
   Else
     Return false;
End Pmap;

The function DataElementTypesMatch ensures that the function is examining constant run-time parameters of the same data type (e.g., both IEEE double precision floating-point numbers). The function, AnIndexExistsThatMapsBetweenPrms looks for an indexing operator that can recover my_rt_prm from the rt_prm. For this example, the indexing operator is the value 2, because block B's constant run-time parameter equals block A's constant run-time parameter at every other point.

If the block diagram processing engine 22 generates code from the model, the generated code conforms to the definitions of interfaced variables supplied by the user and all constant run-time parameters are pooled together.

Referring back to the parameter processing step 106 (of FIG. 7), the execution structure allows parameter expressions with explicitly interfaced variables to be mapped to generated code. As mentioned before, a parameter can be an expression of numeric values, variables, and functions. Furthermore, some of parameter expression variables can be designated as interfaced variables, either in accordance with the user specification or as specified explicitly by the block when run-time parameters are defined. The purpose of interfaced variables is to provide the execution framework with a way to access and modify interfaced variables used by any number of blocks in the block diagram. The execution structure allows for a one-to-one mapping of variables in a parameter expression to support different host/target representations. The expression mapping methodology can be extended to cover transformed interfaced variables as well. Therefore, the expression mapping provides a means by which user marked variables within parameter expressions can be accessed and modified during simulation or within the automatically generated code for the block diagram.

The techniques of parameter optimization, pooling and expression mapping are further illustrated for the bdexample (model 52 of FIG. 3) in code produced by The Simulink/Real-Time Workshop (which corresponds to the block diagram processing engine 26), as shown in the Appendix.

The exact mechanism by which the blocks map their equations to generated code is not central to the concept of parameter processing as described herein. The Simulink 4 and the Real-Time Workshop 4 products by The MathWorks Inc. use a text processing utility to transform the block source code to the required output. Of course, other implementations are possible. For example, the blocks could have methods that produce the output equations in ASCII form that is suitable for placement in the generated code.

The parameter processing techniques as thus described enable users to solve a wide range of problems. Users benefit from the parameter pooling and expression mapping by using pre-packaged blocks provided with the Simulink® tool or blocks available from third parties. Users also are able to extend the tool by defining their own blocks to work seamlessly with the block diagram tool to achieve the benefits of parameter pooling and expression mapping.

During code generation, the blocks provide information about how the generated code should look. In the case of the S-function block example, aft e defining the format of the block output is as follows:

```
% implements "sfun_runtime_opt" "C"
% % Function: mdlOutputs==============================
% % Abstract:
% %
% %          y = rtprm1 + rtprm2 * u
% %
% function Outputs(block, system) Output
    /* %<Type> Block: %<Name> */
    {
       % assign rollVars = ("U", "Y", "P")
       % roll sigIdx = RollRegions, lcv = 5, block, "Roller", rollVars
          % assign u      = LibBlockInputSignal(0, "", 1cy, sigIdx)
          % assign y      = LibBlockOutputSignal(0, "", 1cy, sigIdx)
          % assign rtprm1 = LibBlockParameter(rtprm1, "", 1cy, sigIdx)
          % assign rtprm2 = LibBlockParameter(rtprm2, "", 1cy, sigIdx)
          % <y> = %<rtprm1> * %<rtprm2> * %<u>; ← How to format
            the output equation
       % endroll
    }
%endfunction
```

It is to be understood that while the invention has been described in conjunction with the detailed description thereof, the foregoing description is intended to illustrate and not limit the scope of the invention, which is defined by the scope of the appended claims. Other embodiments are within the scope of the following claims.

APPENDIX

Executable code produced by The Simulink/Real-Time Workshop for the example "bdexample1" is as follows:

```
/*
 *bdexample1.c
 *
 *Real-Time Workshop code generation for Simulink model
 "bdexample1.mdl"
 *
 *Model Version                      : 1.23
 *Real-Time Workshop file version    : 4.0 $Date: 2000/09/19 19:45:
                                       27 $
 *Real-Time Workshop file generated on : Sun Jul 01 23:51:00 2001
 *TLC version                        : 4.0 (Aug 21 2000)
 *C source code generated on         : Jul 01 23:51:00 2001
 *
 *Relevant TLC Options:
 *   InlineParamers      = 1
 *   RollThreshold       = 5
 *   CodeFormat          = RealTime
 *
 *Simulink model settings:
 *   Solver       : FixedStep
 *   StartTime    : 0.0 s
 *   StopTime     : 10.0 s
 *   FixedStep    : 0.2 s
 */
#include <math.h>
#include <string.h>
#include "bdexample1.h"
#include "bdexample1_prm.h"
/* Start of Functions in model "bdexample" */
/*Start the model */
void MdlStart (void)
{
    /* (no start code required) */
} -
/* Compute block outputs */
void MdlOuts (int_T tid)
{
    /* local block i/o variables */
    real_T rtb_temp0 [100];
    real_T rtb_temp1 [100];
/* Sin Block: <Root>/Sine Wave */
{
    int_T i1;
    real_T *y0 = &rtb_temp0 [0];
    const real_T *p_Amplitude = &rtP.p1 [0];    ←example of a pooled
                                                  parameter
    const real_T *P_Frequency = &rtP.p1 [0];    ←example of a pooled
                                                  parameter
    for {i1=0; i1 < 100; i1++} {
        y0[i1] = {p_Amplitude[i1] * sin((p_Frequency{i1})) * ssGeT(rtS) +
            (0.0)):
    }
}
/* Gain Block: <Root>/Gain1 */
{
    int_T i1;
    const real_T *uo = &rtb_temp0[0];
    real_T *y0 = &rtb_temp1[0];
    for (i1 = 0; i1< 100; i1++) {
        y0[i1] = u0[i1] * (1.0 * 2.0+c);  ←example of expression mapping: c
is preserved
    }
}
/* Gain Block: <Root>/Gain2 */
{
    int_T i1;
    const real_T *u0 = &rtb_temp1[0];
    real_T *y0 = &rtb_temp1[0];
    const real_T *p_Gain = &rtP.p1 [0];       ←example of a pooled
                                                parameter
    for (i1 = 0; i1 < 100; i1++) (
        y0[i1] = u0[i1] * (p_Gain[i1]);
    }
}
/* Lookup Block: <Root>/Look-Up Table */
{
    int_T i1;
    const real_T * u0= &rtb_temp0[0];
    real_T * y0 = &rtb_temp0[0];
    for (i1=0; i1 < 100; i1++) {
        y0[i1] = rt_Lookup(&rt.Look_Up_Table _XData[0],
            100,
            u0[i1],
            &rtP.p1[0]);  ← example of a pooled parameter
    }
}
/* Sum Block: <Root>/Sum */
{
    int_T i1;
    const real_T *u0 = &rtb_temp1[0];
    const real_T*u1 = &rtb_temp0 [0];
    real_T*y0 = &rtb_temp1 [0];
    for (i1=0; i1 < &rtb_temp1 [0];
        y0[i1] = u0[i1] + u1[i1];
    }
}
/* S-Function Block: <Root>/S-Function1 */
{
    {
        int_T i1;
        const real_T*u0 = &rtb_temp1 [0];
        const real_T *p_rtprm2 = &rtP.S_Function1_rtprm2 [0]; ← example
                                                                of parameter optimization
        for (i1 = 0; i1 < 100; i1++) {
            y0[i1] = u0 [i1];
        }
    }
}
/* Outport Block: <Root>/Out1 */
{
    int_T il;
    real_T *y0 = &rtY.Out1[0];
    const real_T *u0 = &rtb_temp1[0];
    for (i1=0;i1 < 100; i1++) {
        y0[i1] = u0[i1];
    }
}
}
/* Perform model update */
void MdlUpdate (int_T tid)
(
    /* (no update code required) */
)
/* Terminate function */
void MdlTerminate(void)
{
    /* (no terminate code required) */
}
/* End of Functions in model "bdexample1" */
#include "bdexample1_reg.h"
/* [EOF] bdexample1.c*/
```

In a generated header file, the block diagram parameters data structure is defined to be:

```
typedef struct Parameters_tag{
    real_T p1[100];              /* Expression: a*(1:100)
                                  *External Mode Tunable: no
                                  *Referenced by blocks:
                                  *<Root>/Sine Wave
                                  *<Root>/Sine Wave
                                  *<Root>/Gain2
                                  *<Root>/Look-Up Table
                                  */
    real_T Look_Up_Table_XData [100];  /* Expression: -1:2.01/100:1
                                        *External Mode Tunable: no
                                        *Referenced by block:
                                        *<Root>/Look-up Table
                                        */
    real_T S_Function1_rtprm2 [100];   /* Computed Parameter: rtprm2
                                        *External Mode Tunable: no
                                        *Referenced by block:
                                        *<Root>/S-Function1
                                        */
} Parameter; *_
```

In this example, the S-function block implements the output equation, $$output = prm1 * (prm2 - prm3) * input\_signal$$

and the implementation uses run-time parameters where the first run-time parameter (rtprm1) equals prm1 and the second run-time parameter (rtprm2) equals prm2−prm3, giving:

output=*rtprm1*\*(*rtprm2*)\*input_signal

The source code for this S-function is as follows:

```
/* $Revision: 1.1 $ */
/*
 * File : sfun_runtime_opt.c
 * Abstract:
 *   Illustration of run-time parameter optimization where the
 *   block dialog is assumed to have the following parameters:
 *      prm1: a scalar or a vector of length N
 *      prm2: a scalar or a vector of length N
 *      prm3: a scalar or a vector of length N
 *   the output equation is defined as:
 *      y = prm1 + (prm2-prm3) *u
 *   where u is the input and y is the output. To optimize the execution .
 *   and reduce memory, this equation can be written as:
 *      y = rtprm1 + (rtprm2) *u
 *   where the run-time parameters are defined to be:
 *      rtprm1 = prm1
 *      rtprm2 = prm2-prm3
 *   In this example, these parameters are 'fixed' durihg model exection.
 *   This means there is no need for the mdlProcessParameters function.
 */
#define S_FUNCTION_NAME   sfun_runtime_opt
#define S_FUNCTION_LEVEL 2
#include <string.h>
#include "tmwtypes.h"
#include "simstruc.h".
#define PRM1_IDX 0
#define PRM1(S) ssGetSFcnParam(S, PRM1_IDX)
#define PRM2_IDX 1
#define PRM2(S) ssGetSFcnParam(S, PRM2_IDX)
#define PRM3_IDX 2
#define-PRM3(S) ssGetSFcnParam(S, PRM3_IDX)
#define NPARAMS 3
/* Function: mdlInitializeSizes ===============================================
 * Abstract:
 *     Call mdlCheckParameters to verify that the parameters are okay,
 *     then setup sizes of the various vectors.
 */
static void mdlInitializeSizes(SimStruct *S)
{
   int vectLen;
   ssSetNumSFcnParams(S, NPARAMS);  ← Block requires three dialog parameters
#if defined(MATLAB_MEX_FILE)
   if (ssGetNumSFcnParams($) ! = ssGet$FcnParamsCount(S)) {
       return; /* Parameter mismatch will be reported by Simulink */
   }
#endif
   ssSetSFcnParamTunable(S, PRM1_IDX, false);
   ssSetSFcnParamTunable(S, PRM2_IDX, false);
   ssSetSFcnParamTunable(S, PRM3_IDX, false);
   ssSetNumContStates(S, 0);
   ssSetNumDiscStates(S, 0);
   /*
    * Determine the maximum parameter vector length.
    * This will be the input/output width. Note the
    * input can be scalar expanded:
    *u ----> block ----> y
    * length(u) == 1 or vectLen
    * length(y) == vectLen.
    */
   {
     int_T i;
     vectLen = 1;
     for (i = 0; i < NPARAMS; i++){
         const mxArray *mx = ssGetSFcnParam(S,i);
         int nEls = mxGetNumberGfElements(mx);
         if (nEls > 1) {
            vectLen = nEls;
              break;
         }
      }
   }
   if (!ssSetNumInputPorts(S, 1)) return;
   ssSetInputPortWidth(S, 0, vectLen);
```

```
    ssSetInputPortDirectFeedThrough(S, 0, 1);
    ssSetInputPortOverWritable(S, 0, 1);
    ssSetInputPortReusable(S, 0, 1);
    ssSetInputPortRequiredContiguous(S, 0, 1);
    if (!ssSetNumOutputPorts(S, 1)) return;
    ssSetOutputPortWidth(S, 0, vectLen);
    ssSetOutputPortReusabie(S, 0, 1);
    ssSetNumSampleTimes(S, 1);
    ssSetNumRWork(S, 0);
    ssSetNumIWork(S, 0);
    ssSetNumPWork(S, 0);
    ssSetNumModes(S, 0);
    ssSetNumNonsampledZCs(S, 0);
    /* Take care when specifying exception free code - see sfuntmpl.doc */
    ssSetOptions(S, (SS_OPTION_EXCEPTION_FREE_CODE }
                     SS_OPTION_ALLOW_INPUT_SCALAR_EXPANSION }
                     SS_OPTION_USE_TLC_WITH_ACCELERATOR }
                     SS_OPTION_CALL_TERMINATE_ON_EXIT }
                     SS_OPTION_ALLOW_INPUT_SCALAR_EXPANSION}};
}/* end mdlInitializeSizes */
/* Function: mdlInitializeSampleTimes ========================================
 * Abstract:
 * Specifiy that we inherit our sample time frqm the driving block.
 */
static void md InitializeSampleTimes(SimStruct *S)
{
    ssSetSampleTime(S, 0, INHERITED SAMPLE TIME);
    ssSetOffsetTime(S, 0, 0.0);
}
#define MDL_SET_WORK_WIDTHS    /* Change to #undef to remove function */
#if defined(MDL_SET_WORK_WIDTHS) && defined(MATLAB_MEX_FILE)
/* Function: mdlSetWorkWidths ===============================================
 * Abstract:
 *     Set up run-time parameters.
 */
static Void mdlSetWorkWidthiSimStruct *S)
{
     if (!ssSetNumRunTimeParams(S, 2)).return; ← register during run-time set-up phase
that two parameters are needed
    {
        ssParamRec rtprml;
        int_T dIgParamindex       = PRM1_IDX;
        int_T dim                 = mxGetNumberOfElements(PRM1(S));
        rtprm1.name               ="rtprml";
        rtprm1.nDimensions        = 1;
        rtprm1.dimensions         = &dim;
        rtprm1.dataTypeId         = SS_DOUBLE;
        rtprm1.complexSignal      = COMPLEX_NO;
        rtprm1.data               = (void *)mxGetPr(PRM1(S));
        rtprm1.dataAttribues      = NULL;
        rtprm1.nDlgParamIndices   = 1;
        rtprm1.dlgParamIndices    = &d1gParamIndex;
        rtprm1.transformed        = false;
        rtprm1.outputAsMatrix     = false;
        if (!ssSetRunTimeParamInfo(S, 0, &rtprml)) return; ← register the first run-time
        parameter as equal to the first dialog parameter (prml).
}
{
        ssParamRec rtprm2;
        real_T    *prm2   = mxGetPr(PRM2(S));
        int_T     nEls2   = mxGetNumberOfElements(ssGetSFcriParam(S, PRM2_IDX));
        intT      incl    = (nEls2 > 1);
        real_y    *prm3   = mxGetPr(PRM3(S));
        int_T     nEls3   = mxGetNumberOfElements(ssGetSFcnParam(S, PRM3_IDX));
        int_T     inc3    = (nEls3 > 1);
        int_T     nEls    = nEls2 > nEls3? nEls2: nEls3;
        real_T    *buf    = malloc(nEls*sizeof(buf[0]));
        int_T     dIgParamIndices[2];
        int_T     i;
        if (buf == Null) {
            ssSetErrorStatus(S,"memory alloc error in sfun_runtime_opt");
            return;
        }
      for (i = 0; i < nEls; i++) {
        buff[i]) = *prm2 - *prm3;
        prm2 += inc2;
        prm3 += inc3;
      }
      dlgParamIndices(0) = 2;
```

-continued

```
    digParamIndices(1) = 3;
    rtprm2.name                = "rtprm2";
    rtprm2.nDimensions         = 1;
    rtprm2.dimensions          = &nEls;
    rtprm2.dataTypeId          = SS_DOUBLE;
    rtprm2.complexSignal       = COMPLEX_NO;
    rtprm2.data                = (void *)buf;
    rtprm2.dataAttributes-     = NULL;
    rtprm2;nDlgParamIndices    = 2;
    rtprm2.dlgParamIndices     = dlgParamIndices;
    rtprm2.transformed         = true;
    rtprm2.outputAsMatrix      = false;
    if (!ssSetRunTimeParamInfo (S, 1, &rtprm2)) {  ← register the second dialog
   return;                                           paramerer equal to the dialog
  }                                                  parameters: prm2-prm3.
 }
}
}
#endif /* MDL_SET_WORK_WIDTHS */
/* Function: mdlOutputs =========================================================
 * Abstract:
 *         y = rtprm1 + (rtprm2)*u
 *
 */
static void mdlOutputs(SimStruct *S, int_T tid)
{
    int_T       el;
    int_T       uWidth     = ssGetInputPortWidth(S,0);
    int_T       uInc       = (uWidth > 1);
    const real_T *u         = ssGetInputportRealSignal(S,0);
    int_T       yWidth     = ssGetOutputPortWidth(S,0);
    real_T      *y          = ssGetOutputPortRealSignal(S,0);
    const real_T *rtprml    = (const real_T *)ssGetRunTimeParamInfo(S,0) ->data;
    int_T       inc1       = ssGetRunTimeParamInfo(S,0) ->dimensions > 1;
    const real_T *rtprm2    = (const real_T *)ssGetRunTimeParamInfo(S, 1) ->data;
    int_T       inc2       = ssGetRunTimeParamInfo(S,1) ->dimensions(0) > 1;
    /*
    *Generate sum and if needed average.
    */
    for (el = 0; el < yWidth; el++)
        *y++ = *rtprml + (*rtprm2) * (*u);  ←Use run-time parameters in output method
        u += uInc;
        rtprml += inc1;
        rtprm2 += inc2;
    }
}/* end mdlOutputs */
/* Function: mdlTerminate =========================================================
 * Abstract:
 * Free the 2nd run-time parameter data because it was allocated by
 * this block (i.e., not a direct map to dialog parameters).
 */
static void mdlTerminate(SimStruct *S)
{
   if (ssGetNumRunTimeParams(S) >= 2 &&
     ssGetRunTimeParamInfo(S,1) != NULL &&
     ssGetRunTimeParamInfo(S,1) ->data != NULL) {
     free(ssGetRunTimeParamInfo(S,1) ->data);
   }
}
#ifdef MATLAB_MEX_FILE       /* Is this file being compiled as a MEX-file? */
#include "simulink.c"        /* MEX-file interface mechanism */
#else
#include "cg_sfun.h"         /* Code generation registration function */
#endif
```

What is claimed is:

1. A method comprising:

accessing a parameter for a block in a graphical model, accessing the parameter being performed by a device;

determining that the parameter contains an expression including at least a mathematical operator or a logical operator, determining that the parameter contains the expression being performed by the device, and the expression containing:

a first variable that is accessible and updatable during a simulation based on an execution of code generated for the graphical model, and one or more second variables that remain constant during the execution of the generated code;

constructing a data structure describing the expression based on the first variable and the one or more second variables, constructing the data structure describing the expression being performed by the device;

using the data structure to pool the one or more second variables by allocating a common memory location for references to the one or more second variables,
using the data structure to pool the one or more second variables being performed by the device;
generating the code for the graphical model based on the first variable and the references to the one or more pooled second variables in the common memory location,
generating the code for the graphical model being performed by the device; and
causing the generated code to be executed,
causing the generated code to be executed being performed by the device, and
causing the generated code to be executed including:
updating the first variable, and
accessing at least one of the second variables from the common memory location during the execution of the generated code.

2. The method of claim 1, where the first variable is declared as a read/write variable in the generated code.

3. The method of claim 1, where the first variable is declared as a read-only variable in the generated code.

4. The method of claim 1, where the one or more second variables are collapsed into a single quantity in the generated code.

5. The method of claim 1,
where another parameter for another block in the graphical model contains a reference to the first variable, and
where the first variable is declared only once in the generated code.

6. The method of claim 1, where the expression is maintained in the generated code.

7. The method of claim 1, where the data structure is an abstract syntax tree.

8. The method of claim 7, where the first variable and the one or more second variables are represented as nodes in the abstract syntax tree.

9. The method of claim 8, where pooling the one or more second variables comprises:
collapsing nodes of the abstract syntax tree representing the one or more second variables into a single node.

10. The method of claim 1, where using the data structure to pool the one or more second variables comprises:
determining that a particular criterion is satisfied based on the parameter, and
using the data structure to pool the one or more second variables based on determining that the particular criterion is satisfied.

11. A system comprising:
one or more processors to:
receive a parameter for a block in a graphical model;
determine that the parameter contains an expression including at least a mathematical operator or a logical operator,
the expression containing:
a first variable that is accessible and updatable during a simulation based on an execution of the generated code, and
one or more second variables that remain constant during the execution of the generated code;
construct a data structure that describes the expression based on the first variable and the one or more second variables;
use the data structure to pool the one or more second variables by allocating a common memory location for references to the one or more second variables; and
generate the code for the graphical model based on the first variable and the references to the one or more pooled second variables in the common memory location.

12. The system of claim 11, where the one or more second variables are collapsed into a single quantity in the generated code.

13. The system of claim 11, where the expression is maintained in the generated code.

14. The system of claim 11, where, when using the data structure to pool the one or more second variables, the one or more processors are to:
determine that a particular criterion is satisfied based on the parameter, and
use the data structure to pool the one or more second variables based on determining that the particular criterion is satisfied.

15. A non-transitory medium storing instructions, the instructions comprising:
one or more instructions that, when executed by one or more processors, cause the one or more processors to:
access a parameter for a block in a graphical model;
determine that the parameter contains an expression including at least a mathematical operator or a logical operator,
the expression containing:
a first variable that is accessible and updatable during a simulation based on an execution of the generated code, and
one or more second variables that remain constant during the execution of the generated code;
construct a data structure describing the expression based on the first variable and the one or more second variables;
use the data structure to pool the one or more second variables by allocating a common memory location for references to the one or more second variables; and
generate code for the graphical model based on the first variable and the references to the one or more pooled second variables in the common memory location.

16. The medium of claim 15, where the first variable is declared as a read/write variable in the generated code.

17. The medium of claim 15, where the first variable is declared as a read-only variable in the generated code.

18. The medium of claim 15, where the one or more second variables are collapsed into a single quantity in the generated code.

19. The medium of claim 15,
where a second parameter for a second block of the graphical model contains a reference to the first variable, and
where the first variable is declared only once in the generated code.

20. The medium of claim 15, where the expression is maintained in the generated code.

* * * * *